(12) United States Patent
Morrow et al.

(10) Patent No.: US 8,553,224 B2
(45) Date of Patent: Oct. 8, 2013

(54) FIBER BUNDLE FOR HIGH EFFICIENCY, SPATIALLY RESOLVED COUPLING

(75) Inventors: C. Alexander Morrow, Gahanna, OH (US); Theodore J. Ronningen, Lewis Center, OH (US)

(73) Assignee: Battelle Memorial Institute, Columbus, OH (US)

( * ) Notice: Subject to any disclaimer, the term of this patent is extended or adjusted under 35 U.S.C. 154(b) by 0 days.

(21) Appl. No.: 13/324,168

(22) Filed: Dec. 13, 2011

(65) Prior Publication Data

US 2012/0081704 A1    Apr. 5, 2012

Related U.S. Application Data

(63) Continuation of application No. PCT/US2010/038789, filed on Jun. 16, 2010.

(60) Provisional application No. 61/187,874, filed on Jun. 17, 2009.

(51) Int. Cl.
*G01J 3/28* (2006.01)

(52) U.S. Cl.
USPC .............................. 356/326; 356/302; 356/328

(58) Field of Classification Search
USPC .................. 356/300, 302, 326, 328; 385/116, 385/121, 119
See application file for complete search history.

(56) References Cited

U.S. PATENT DOCUMENTS

| | | | |
|---|---|---|---|
| 4,494,872 A * | 1/1985 | Busch | 356/328 |
| 5,112,127 A | 5/1992 | Carrabba et al. | |
| 5,615,673 A | 4/1997 | Berger et al. | |
| 5,911,017 A | 6/1999 | Wach et al. | |
| 6,031,619 A | 2/2000 | Wilkens et al. | |
| 6,310,686 B1 | 10/2001 | Jiang | |
| 6,377,739 B1 * | 4/2002 | Richardson et al. | 385/115 |
| 6,483,581 B1 | 11/2002 | Ben-Amotz et al. | |
| 6,486,948 B1 | 11/2002 | Zeng | |
| 6,717,668 B2 | 4/2004 | Treado et al. | |
| 7,092,087 B2 | 8/2006 | Kumar et al. | |
| 7,242,468 B1 | 7/2007 | Zhang | |
| 2002/0131699 A1 | 9/2002 | Raguin et al. | |
| 2009/0040519 A1 | 2/2009 | Zhang | |

FOREIGN PATENT DOCUMENTS

WO    03005085 A1    1/2003

OTHER PUBLICATIONS

Notification of Transmittal of the International Search Report and the Written Opinion of the International Searching Authority for PCT Application No. PCT/US2010/038789; Mailing Date of Nov. 10, 2010; European Patent Office, Rijswijk, The Netherlands.

* cited by examiner

*Primary Examiner* — Layla Lauchman
(74) *Attorney, Agent, or Firm* — Thomas E. Lees, LLC

(57) ABSTRACT

Optical fibers are utilized to provide high efficiency, spatially resolved coupling of light from collection optics to an imaging spectrometer. In particular, a micro lens array may be utilized to couple light from multiple spatial locations into individual optical fibers. At the opposite end of the fiber bundle, the fibers are packed tightly together to send the light into an imaging spectrograph. The light that enters this spectrograph maintains its spatial separation, for instance, along the array dimension and is spectrally dispersed, for instance, along a dimension orthogonal to the array dimension. This spatially separated, wavelength resolved light can then be recorded on a two dimensional detector such as a CCD camera.

18 Claims, 10 Drawing Sheets

FIBER BUNDLE FOR HIGH EFFICIENCY, SPATIALLY RESOLVED COUPLING

CROSS REFERENCE TO RELATED APPLICATIONS

This application is a continuation of International Application No. PCT/US2010/038789, filed Jun. 16, 2010, entitled "FIBER BUNDLE FOR HIGH EFFICIENCY, SPATIALLY RESOLVED COUPLING, AND SPECTROMETER USING THE SAME" (as established by the International Searching Authority), which claims the benefit of U.S. Provisional Patent Application Ser. No. 61/187,874 filed, Jun. 17, 2009, entitled "FIBER BUNDLE FOR HIGH EFFICIENCY, SPATIALLY RESOLVED COUPLING", the disclosures of which are hereby incorporated by reference.

BACKGROUND

The present invention relates in general to spectrographic data collection, and in particular, to the utilization of a fiber bundle for the spatially resolved coupling of light to a spectrograph.

An assortment of analytical identification methods exist for the non-destructive testing of materials. Particularly, various spectroscopic methods, including Raman spectroscopy, can be advantageously employed in the practical identification of materials under test. By way of illustration, in dispersive Raman spectroscopy, a laser is used as an excitation source to focus light onto a particle. The laser light from the excitation source interacts with the Raman active chemical bonds of the particle impinged upon by the laser light to produce Raman lines that are shifted from the wavelength of the excitation laser by corresponding vibration frequencies. Light from the sample area of the particle is collected and is sent through a filter that blocks the excitation wavelength while passing the Raman-shifted wavelengths to a spectrometer. The spectrometer utilizes a grating that disperses light so that different wavelengths leave the grating at different angles.

The light from the grating travels to an optical detector, such as a charge coupled device (CCD) camera, where the divergence in angles causes light at different wavelengths to arrive on different pixels of the CCD to capture data representative of the Raman spectra of the particle under interrogation. The data captured by the CCD can be utilized as a signature, which is compared to a library of previously determined signatures to identify the material excited by the laser.

BRIEF SUMMARY

According to various aspects of the present invention, a fiber optic coupling assembly comprises a plurality of optical fibers, a primary collection mounting member and a termination mounting member. The plurality of optical fibers each have a collection end and a termination end. The primary collection mounting member holds the collection end of at least a portion of the plurality of optical fibers in a collection pattern such that the collection end of each optical fiber is spaced from adjacently held optical fibers and the collection end of each optical fiber has a known spatially resolved position relative to the collection end of at least one other optical fiber held by the primary collection mounting member. Correspondingly, the termination mounting member holds the termination end of the plurality of optical fibers in a termination pattern arranged to interface to an input of an associated detection system, e.g., an imaging spectrograph. The fiber optic coupling assembly also comprises at least one micro lens secured to the primary collection mounting member so as to couple light to a corresponding collection end of an associated optical fiber.

According to further aspects of the present invention, the at least one micro lens comprises a micro lens array secured to the primary collection mounting member such that a micro lens aligns in register with a corresponding collection end of an associated optical fiber. In this regard, the micro lens array and corresponding collection ends of the optical fibers can form a collection pattern such as a linear array of spaced optical fibers.

According to further aspects of the present invention, the fiber optic coupling assembly further comprises a secondary collection mounting member remotely positionable from the primary collection mounting member, which holds the collection end of at least a portion of the remainder of the plurality of optical fibers not held by the primary collection mounting member. As such, the secondary collection mounting member can be utilized to couple, for example, a calibration signal to the termination end of the fiber optic coupling assembly.

According to still further aspects of the present invention, an optical system comprises light collection optics, a spectrograph, and a fiber optic coupling system that couples light from the collection optics to the spectrograph. The light collection optics collects light from a sample area. The spectrograph has an input and an optical detector.

The fiber optic coupling assembly comprises a plurality of optical fibers, a primary collection mounting member and a termination mounting member. The plurality of optical fibers each have a collection end and a termination end. The primary collection mounting member holds the collection end of at least a portion of the plurality of optical fibers in a collection pattern such that the collection end of each optical fiber has a known spatially resolved position relative to the collection end of at least one other optical fiber held by the primary collection mounting member. Further, the collection ends of at least two optical fibers held by the primary collection mounting member are spaced from each other sufficiently to collect light from distinct spatial regions of the sample area in cooperation with the light collecting optics. Correspondingly, the termination mounting member holds the termination end of the plurality of optical fibers in a termination pattern arranged to interface to the input of the spectrograph. The fiber optic coupling assembly also comprises at least one micro lens secured to the primary collection mounting member so as to couple light to a corresponding collection end of an associated optical fiber. In this regard, light that enters the spectrograph from the optical fibers maintains spatial separation along the termination pattern of the optical fibers held by the termination mounting member and light is spectrally dispersed onto the optical detector so as to record spatially separated, wavelength resolved light.

According to further aspects of the present invention, the spectrometer of the optical system may a utilize a spectrometer grating that disperses light from the termination end of the optical fibers onto the optical detector such that the spatially separated light from each optical fiber is dispersed onto the optical detector along a dimension that is orthogonal to the dimension associated with the termination pattern.

According to still further aspects of the present invention, the optical system further comprises a secondary collection mounting member remotely positionable from the primary collection mounting member, which holds the collection end of at least a portion of the remainder of the plurality of optical fibers not held by the primary collection mounting member.

Thus for example, the optical system may further comprise a calibration source operative to emit a calibration light that is coupled to the collection end of at least one optical fiber held by the secondary collection mounting member to provide a signal to calibrate the optical detector.

According to still further aspects of the present invention, a method of optically coupling light in a system comprises utilizing light collection optics that collect light from a sample area, utilizing a spectrograph having an input and an optical detector and arranging a fiber optic coupling assembly to couple light from the light collection optics to the spectrograph.

In this regard, the fiber optic coupling assembly has a plurality of optical fibers, a primary collection mounting member and a termination mounting member. Each optical fiber has a collection end and a termination end. Moreover, the primary collection mounting member holds the collection end of at least a portion of the plurality of optical fibers in a collection pattern such that the collection end of each optical fiber has a known spatially resolved position relative to the collection end of at least one other optical fiber held by the primary collection mounting member. Further, the collection ends of at least two optical fibers held by the primary collection mounting member are spaced from each other sufficiently to collect light from distinct spatial regions of the sample area in cooperation with the light collecting optics.

The method still further comprises aligning a plurality of micro lenses secured to the mounting member such that a micro lens aligns in register with a corresponding collection end of an associated optical fiber. For example, a plurality of micro lenses may be secured to the mounting member such that a micro lens aligns in register with a corresponding collection end of an associated optical fiber in the fiber optic bundle.

Correspondingly, the termination mounting member holds the termination end of the plurality of optical fibers in a termination pattern arranged to interface to the input of the spectrograph. As such, light that enters the spectrograph from the optical fibers maintains spatial separation along the termination pattern of the optical fibers held by the termination mounting member and light is spectrally dispersed along an orthogonal dimension onto the optical detector so as to record spatially separated, wavelength resolved light.

BRIEF DESCRIPTION OF THE SEVERAL VIEWS OF THE DRAWINGS

The following detailed description of various aspects of the present invention can be best understood when read in conjunction with the following drawings, where like structure is indicated with like reference numerals, and in which.

DETAILED DESCRIPTION

According to various aspects of the present invention, a fiber optic coupling assembly is utilized for the high efficiency, spatially resolved coupling of light from collection optics to an imaging spectrometer. The fiber optic coupling assembly includes a plurality of optical fibers arranged into an optical fiber bundle having a first end, referred to herein as a collection end, and a second end opposite the first end, referred to herein as a termination end. In exemplary implementations, the fiber optic coupling assembly further includes a micro lens array at the collection end of the fiber bundle. The micro lens array is utilized to couple light from multiple spatial locations into individual optical fibers of the fiber optic coupling assembly.

According to further aspects of the present invention, the optical fibers are packed tightly together at the termination end. More particularly, the optical fiber ends are arranged to send the collected light into an imaging spectrograph. In an illustrative example, the termination end of the fiber bundle is packed into a linear array, zigzag, or other suitable termination pattern such that the light that enters the spectrograph maintains spatial separation along the termination end fiber optic array dimension and is spectrally dispersed, e.g., along a dimension that is orthogonal to the fiber optic array dimension. This spatially separated, wavelength resolved light can then be recorded on a two dimensional detector such as a CCD camera.

Figure 1:
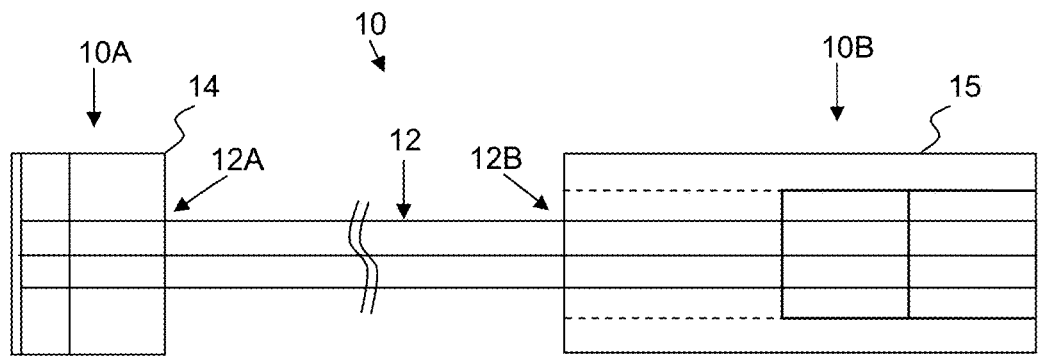
FIG. 1 is a schematic illustration of a fiber optic coupling assembly for the spatially resolved coupling of light, according to various aspects of the present invention.

Referring now to the drawings and in particular to FIG. 1, an exemplary implementation of a fiber optic coupling assembly 10 is illustrated according to various aspects of the present invention. In general, the fiber optic coupling assembly 10 comprises a light collection end portion 10A and a termination end portion 10B. A plurality of optical fibers 12 define a fiber bundle that couple the collection end portion 10A to the termination end portion 10B. In this regard, the optical fibers 12 also each have a collection end 12A and a termination end 12B. Still further, the fiber optic coupling assembly 10 comprises a collection end section mounting member 14 that holds the collection end 12A of the optical fibers 12, and a termination end section mounting member 15 that holds the termination end 12B of the optical fibers 12.

An exemplary implementation of the fiber optic coupling assembly 10 comprises forty-eight optical fibers 12. A primary collection mounting member 14 holds the collection end 12A of at least a portion of the forty-eight optical fibers 12 in an array or other suitable collection pattern such that the collection end of 12A each optical fiber 12 is spaced from adjacently held optical fibers and the collection end 12A of each optical fiber has a known spatially resolved position relative to the collection end of at least one other optical fiber held by the primary collection mounting member 14.

By way of example, the collection end 12A of each optical fiber 12 in an illustrative implementation can be held by the primary mounting member 14 so as to have a known spatially resolved position relative to the collection end 12A of adjacent optical fibers 12, e.g., so as to have a known spacing between adjacent optical fibers 12. A secondary collection end mounting member (or other number of collection end mounting members) can be utilized to hold the collection ends 12A of the remainder of the optical fibers 12 if the primary collection end mounting member 14 holds less than the entirety of optical fibers 12, as will be described for example, with reference to FIG. 10. This may be useful, e.g., to dedicate at least one optical fiber 12 to calibration tasks, to collect light from multiple, distinct physical locations that could not otherwise be covered by a single collection end mounting member, etc.

The termination end section mounting member 15 holds the termination end 12B of the forty-eight optical fibers 12 in a termination pattern arranged to interface to an input of an associated detection system. For instance, instead of being spaced out, at least a portion of the termination ends 12B of the optical fibers 12 are densely packed into an array, e.g., linear array, zigzag or other tightly packed pattern. In practice, any number of optical fibers 12 may be utilized.

Figure 2:
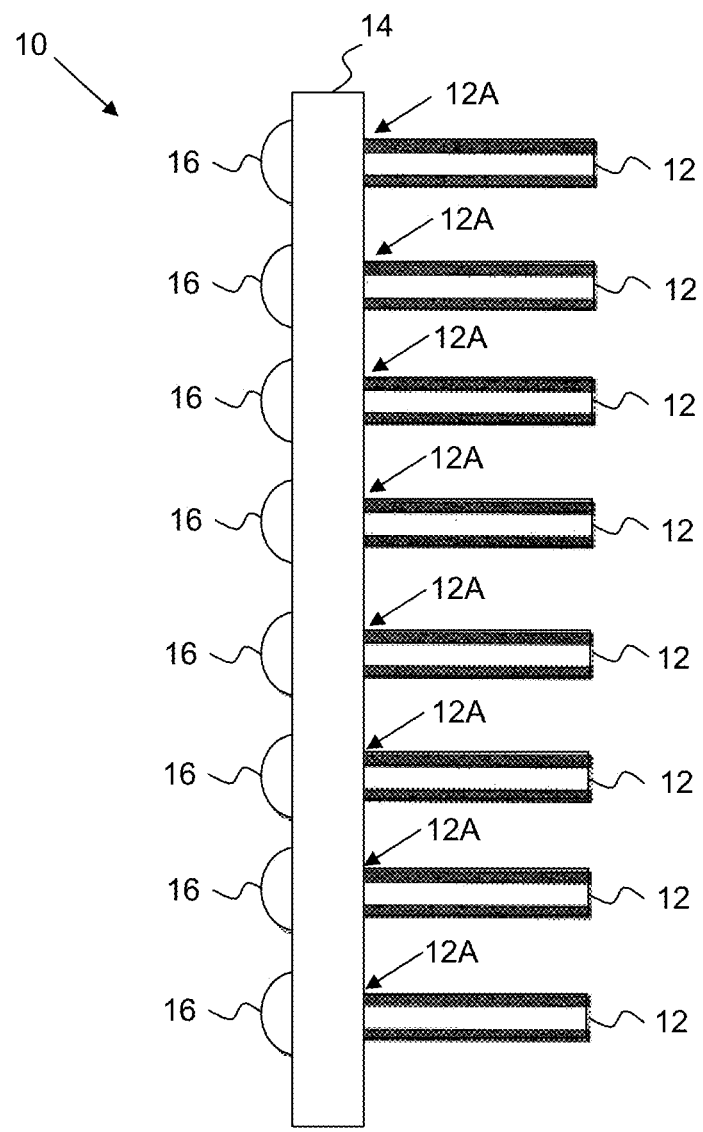
FIG. 2 is a schematic illustration of an exemplary light collection end of a fiber optic coupling assembly for the spatially resolved coupling of light, according to various aspects of the present invention.

Referring to FIG. 2, a view of select components of the collection end portion 10A of a fiber optic coupling assembly 10 is illustrated, according to various aspects of the present invention. The collection end portion 10A comprises, in general, a plurality of optical fibers 12 held by a collection end section mounting member 14 and at least one micro lens 16 secured to the collection end section mounting member 14, generally opposite of the optical fibers 12 so as to couple light to a corresponding collection end of an associated optical fiber. A plurality of micro lenses 16 is illustrated by way of example.

In an exemplary implementation, each optical fiber 12 comprises, for example, a multimode fiber having an outside diameter of approximately 100 micrometers ($\mu$m) to approximately 125 $\mu$m and an inner core of approximately 50 to 62 $\mu$m. Moreover, each optical fiber 12 is constructed from any suitable optical fiber material, including Photonic-crystal fiber (PCF). However, other fiber optic materials, other optical fiber dimensions and other optical fiber characteristics may alternatively be utilized. The optical fibers 12 are utilized to transmit light in one or more ranges across the electromagnetic spectrum, e.g., visible light, ultraviolet light, infrared light, etc. Accordingly, the fiber optic coupling assembly 10 may be integrated with a number of different hyperspectral imaging systems, an example of which is described in greater detail herein.

Still further, the collection end 12A of each optical fiber 12 is secured to the collection end section mounting member 14 so as to define a collection pattern. The collection pattern is configured such that the collection end 12A of each optical fiber 12 has a known spatially resolved position, e.g., relative to the other optical fibers 12 held by the collection end mounting member 14. In an exemplary implementation, a predetermined space is used to separate the collection end 12A of adjacent optical fibers 12. In this regard, the predetermined space between adjacent collection ends 12A is selected to obtain a desired result, e.g., to affect the spatial resolution of the fiber optic bundle.

Each micro lens 16 comprises, for example, a generally cylindrical shape, hemisphere, or other shape including a custom shape that achieves suitable light collection for a given application. For example, as illustrated, the plurality of micro lenses 16 are secured to the collection end section mounting member 14 such that a micro lens 16 aligns in register with a corresponding collection end 12A of an associated optical fiber 12 of the bundle. Under this configuration, the fiber optic coupling assembly 10 provides high efficiency, spatially resolved coupling of light, suitable for applications that collect and couple light from associated collection optics to an optical detector.

By way of illustration, and not by way of limitation, the collection pattern illustrated in FIG. 2 forms a linear array of spaced apart optical fibers 12. More particularly, the collection end section mounting member 14 secures the collection end 12A of each optical fiber 12 held thereby, in a pattern that is defined such that the collection ends 12A of the optical fibers 12 form a substantially linear array. Moreover, according to further aspects of the present invention, the collection mounting member 14 holds the collection end 12A of each optical fiber 12 at a known pitch from the collection end 12A of adjacent optical fibers 12. Thus, the collection end 12A of each optical fiber 12 is spaced from the collection end 12A of adjacent optical fibers 12 by a predetermined distance. For instance, the arrangement of the collection ends of the optical fibers in a linear array can be used to image a line, e.g., of a corresponding sample area.

However, other patterns of fiber optic placement and corresponding implementations may be utilized to image regions or shapes other than a line, e.g., depending upon the particular requirements of a specific application. For instance, the collection end 12A of the fiber optic coupling assembly 10 may be configured to image widely separated locations.

In the illustrative example, the plurality of micro lenses 16 defines a micro lens array that is secured to the collection end section mounting member 14 opposite the optical fibers 12 in a manner that generally corresponds to the pattern formed by the collection ends 12A of the optical fibers 12 such that a micro lens 16 aligns in register with a corresponding collection end 12A of an associated optical fiber 12.

In an exemplary implementation, the collection end section mounting member 14 comprises a flat polished base that is approximately fifteen millimeter (mm) wide by approximately three mm thick. In further exemplary implementations, the collection end section mounting member 14 further comprises a first facet that supports the array of micro lenses 16, which are aligned on the first facet of the collection end section mounting member 14 such that each micro lens 16 registers substantially with a corresponding collection end 12A of a corresponding optical fiber 12.

With continued reference to FIG. 2, each micro lens 16 can have a dimension that is similar to, or different from that of its corresponding optical fiber 12. In a first example illustrating similar dimensions, each optical fiber 12 has a diameter of approximately 100 $\mu$m. Under this arrangement, each micro lens 16 also has a diameter of approximately 100 $\mu$m. In this example, the mounting member 14 can provide a pitch of approximately 100 $\mu$m or greater between adjacent optical fiber collection ends 12A. In a second example illustrating different dimensions, each micro lens 16 has a diameter greater than that of its corresponding optical fiber 12. For example, each optical fiber 12 has a diameter of approximately 100 $\mu$m, but the micro lenses 16 each have a diameter of approximately 250 $\mu$m. Under this arrangement, the mounting member 14 can provide a pitch of approximately 250 µm or greater between adjacent optical fiber collection ends 12A.

However, other arrangements may be implemented, including various other configurations, dimensions, patterns, etc., of optical fibers 12 and micro lenses 16 of the fiber bundle. For example, the spacing between adjacent optical fiber collection ends 12A need not be a uniform distance. Rather, the spatial data collection requirements of a given implementation may dictate other configurations. Moreover, the optical fiber collection ends 12A need not be arranged in a linear array. Instead, any pattern of spaced optical fiber collection ends 12A may be implemented so long as the spatial relationship of the optical fiber collection ends 12A is known.

According to various aspects of the present invention, the fiber optic coupling assembly 10 is suitable for use in spectroscopic applications to collect light in a sample region and transfer the collected light to a spectrograph and detector. According to still further aspects of the present invention, the fiber optic coupling assembly 10 facilitates the ability to separately detect spectra from distinct spatial regions in imaging spectroscopic applications. In this regard, the fiber optic coupling assembly 10, according to various aspects of the present invention, uses the micro lenses 16 in the micro lens array to efficiently couple light from spatially resolved regions of an image into the corresponding optical fibers 12. As such, for example, at least two optical fibers are spaced from each other within the collection mounting member by an amount sufficient to collect light from independent regions of a sample area when the fiber optic coupling assembly is coupled to associated light collection optics.

Moreover, according to various aspects of the present invention, the fiber optic coupling assembly 10 collects light efficiently and is thus suitable for use in applications where the amount of light present is small. According to aspects of the present invention, by employing the micro lens array, at least 95% of the light collected from the sample region may be coupled into the fiber optic coupling assembly 10. Thus, for example, the fiber optic coupling assembly 10 may be used to couple light from the optics of a Raman system to a corresponding imaging spectrometer.

However, unlike conventional Raman systems, the configuration of the collection end section mounting member 14, and correspondingly, the configuration of the micro lenses 16 of the micro lens array couple light from multiple locations into corresponding individual optical fibers 12 of the corresponding optical fiber bundle so as to define a pattern of known spatially resolved positions. As such, multiple readings may be simultaneously collected, even from significantly varied positions within the sample area being interrogated, e.g., by controlling the spatial position of the collection end of each optical fiber 12. Thus, multiple samples may be collected in parallel. The dimensions discussed herein with regard to FIG. 2 are representative of typical optical fibers, but variations in the size and spacing of the optical fibers 12 and micro lenses 16 can be implemented to suit the needs of particular applications. Moreover, the number of optical fibers 12 or micro lenses 16 may also vary, depending upon the application.

The optical fibers 12 used to couple the collecting end 12A to the termination end 12B may be multi-mode or single-mode fibers. If multi-mode optical fibers are used, it may be necessary to ensure adequate mode-mixing of the collected radiation, e.g., where wavelength modulation would otherwise be introduced at the termination end. By way of illustration, the length of the optical fibers is selected to ensure adequate mode-mixing performance, e.g., within an acceptable level of noise. Other ways to ensure mode-mixing include, but are not limited to, crimping the fibers and splicing the fibers. When a single-mode fiber is used, it is not necessary to ensure mode-mixing of the collected radiation.

It is possible for the collecting end 12A and the termination end 12B of the optical fibers 12 and/or the light collection end portion 10A and the termination end portion 10B of the fiber optic coupling assembly 10, to have substantially different numerical apertures, e.g., to accommodate differences between the numerical aperture of the collection optics and the numerical aperture of the spectrometer. Thus, for example, the optical fibers 12 of the fiber bundle and/or the fiber optic coupling assembly 10, can serve to create a match between two mismatched apertures, e.g., a mismatch between the collection optics and the spectrometer of a corresponding system. The fiber optic coupling assembly can thus translate light between a first numerical aperture associated with the light collection optics and the second numerical aperture associated with the spectrograph.

By way of illustration, assume that the microscopy system has a numerical aperture $NA_1$. Further, assume that the spectrometer has a numerical aperture of $NA_2$ that is different from the numerical aperture $NA_1$. Because of the mismatch, there is generally an inefficient use of the spectrometer to translate between numerical aperture spaces. However, according to certain aspects of the present invention, the optical fibers 12 of the fiber bundle are utilized to translate between numerical apertures $NA_1$ and $NA_2$. Moreover, translation may occur without loss. That is, the balancing of the numerical apertures of the collection optics and the spectrometer is performed with no loss to the optical signal within the fibers 12, thus high throughput spatial resolution is maintained.

Figure 3:
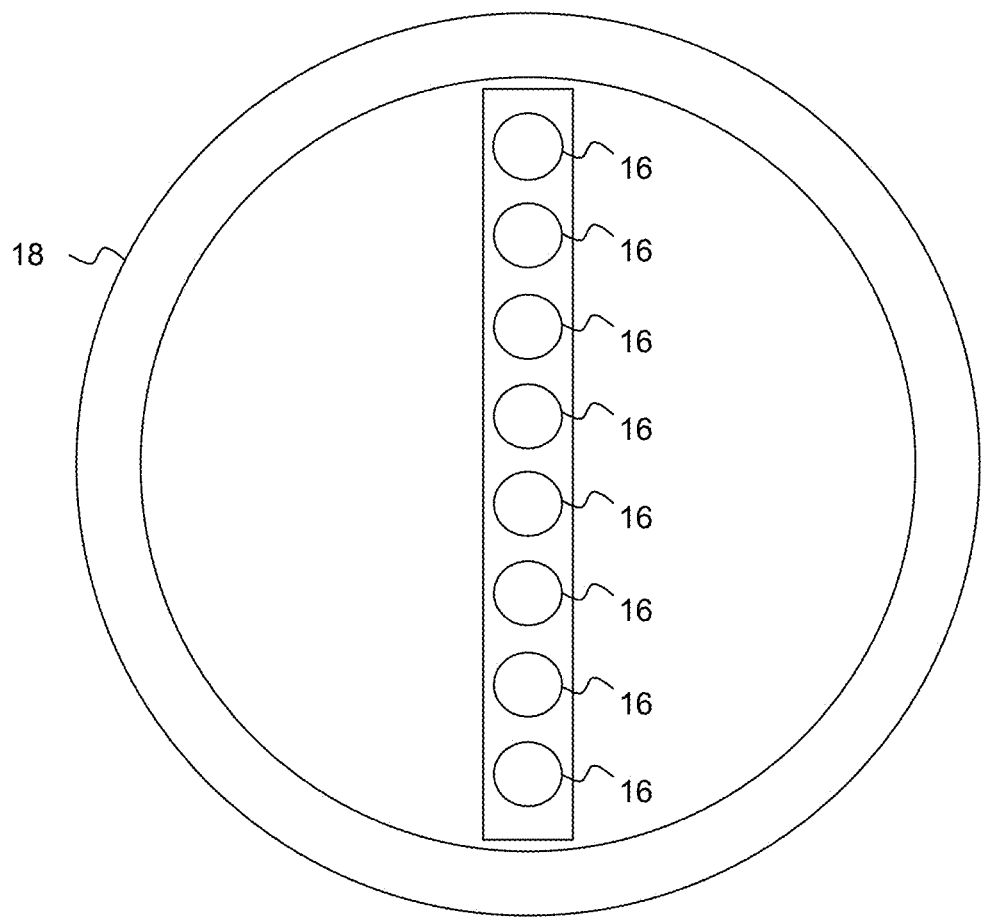
FIG. 3 is a front view of the exemplary light collection end of FIG. 2, according to various aspects of the present invention.

Referring to FIG. 3, a front view of the fiber optic coupling assembly 10 is illustrated. In this exemplary configuration, each micro lens 16 has a generally circular cross section and is substantially evenly spaced from adjacent micro lenses 16 in the collection end section mounting member 14. Moreover, the collection end section mounting member 14 is positioned within a ring 18, which serves as a housing member for the light collection end portion 10A of the fiber optic coupling assembly 10.

Figure 4:
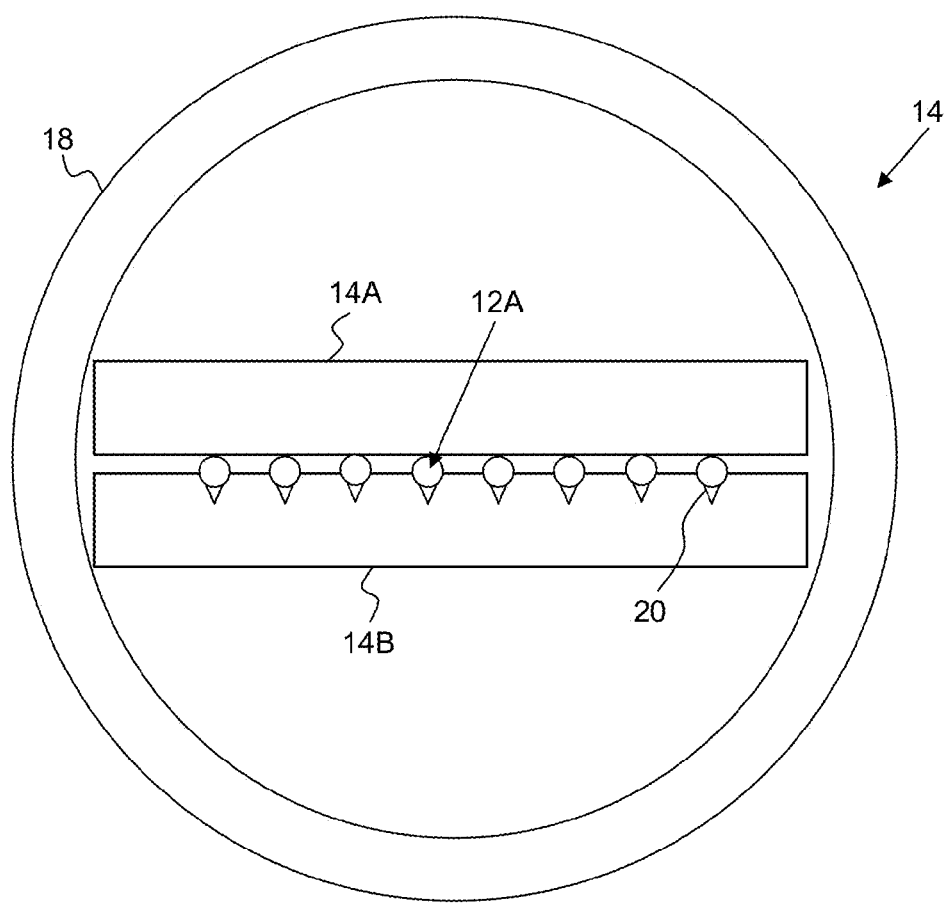
FIG. 4 is an illustration of a holder for a light collecting end of an optical fiber bundle, according to various aspects of the present invention.

Referring to FIG. 4, a front view of the fiber optic coupling assembly 10 is illustrated with the micro lenses 16 removed to illustrate select features of the collection end section mounting member 14. As noted above, the collection end section mounting member 14 holds the collection ends 12A of associated optical fibers 12 such that the pitch between adjacent optical fibers 12 is known. In the exemplary implementation of FIG. 4, the collection end section mounting member 14 is implemented as a two-part housing, including a lid 14A and base 14B that mate together to hold the optical fibers 12 between the mated halves of the lid 14A and base 14B. In an illustrative example, the lid 14A and base 14B of the two-part housing have a length of approximately 15 mm and a thickness of approximately 1.5 mm. Moreover, the illustrative collection end section mounting member 14 has a plurality of spaced channels 20, each channel 20 for receiving a corresponding optical fiber 12, which is secured between the two housing parts 14A, 14B at a predetermined position when the housing is assembled. The optical fibers 12 can be held to the housing any suitable technique. In an exemplary implementation, a target glue cap that is approximately 15 µm is used to secure the optical fibers 12 to the two part housing 14A, 14B.

Figure 5:
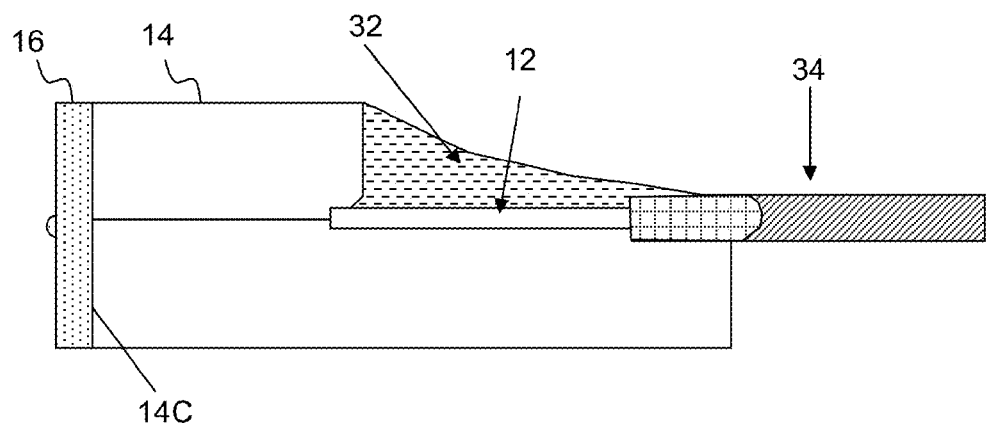
FIG. 5 is an illustration of a micro lens array at the light collection end of a fiber optic coupling assembly according to various aspects of the present invention.

Referring to FIG. 5, in an illustrative exemplary implementation, the collection end section mounting member 14 comprises a first facet 14C for securing the micro lenses 16 to the collection end section mounting member. The collection end section mounting member 14 is approximately 15 mm deep, having approximately, a 5 mm gap between the collection end 12A of each optical fiber 12 and its corresponding micro lens 16. Moreover, the collection end section mounting member 14 includes a sealant 32 to protect the bare optical fibers 12. For example, the optical fibers 12 may extend "bare", e.g., stripped of their cladding layer, for approximately 10 mm into the collection end section mounting member 14. In this regard, the optical fibers 12 may have, by way of example, a bare diameter of approximately 70 μm and one or more buffer layers 34, e.g., including cladding and any other protective layers, which extend the diameter of the optical fiber to a diameter of approximately 90-100 μm.

Figure 6:
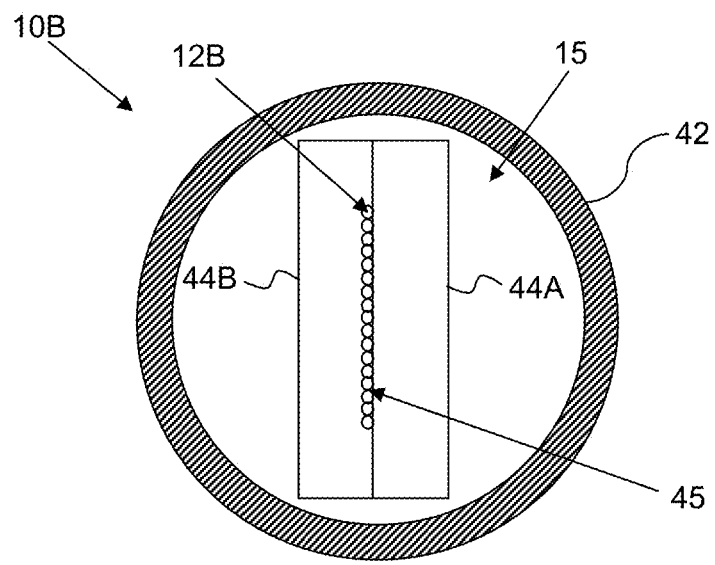
FIG. 6 is a schematic illustration of a termination end of a fiber optic coupling assembly, according to various aspects of the present invention.

Referring to FIG. 6, the termination end portion 10B of the fiber optic coupling assembly 10 is illustrated according to various aspects of the present invention. In an illustrative example, the termination end section 10B comprises, for example, a generally ring-shaped brass ferrule 42. By way of illustration, the brass ferrule 42 has an outside diameter of approximately 10.97 mm and an inside diameter of approximately 6.33 mm. As illustrated, a termination end section mounting member 15 is implemented as a termination end holder comprising a lid 44A and a base 44B that secure the termination end 12B of the optical fibers 12. In an illustrative example, the termination end holder 44 comprises a glass substrate that is fit into, e.g., is centered within the inside diameter of the ferrule 42. Moreover, the termination end section mounting member 44 may define termination channels 45 for supporting the optical fibers 12, e.g., in a manner analogous to the channels 20 described with reference to FIG. 4. The optical fibers 12 are packed into the termination channels 45, to define an array width that is approximately 3.6-6.0 mm.

Figure 7:
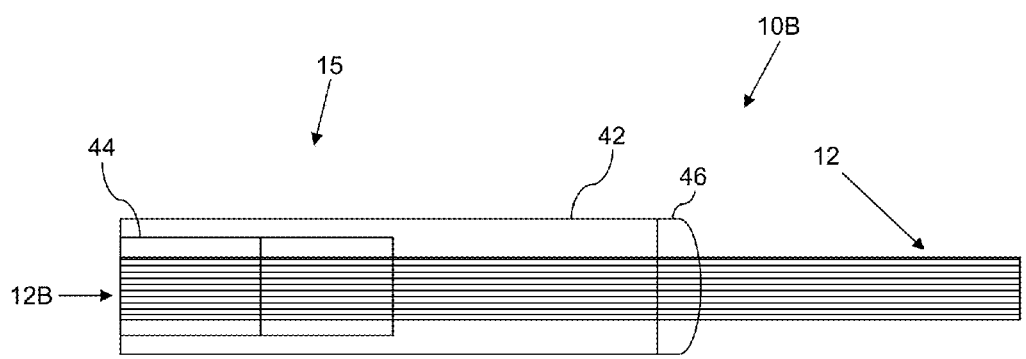
FIG. 7 is a side view of the termination end of FIG. 6, according to various aspects of the present invention.

Referring to FIG. 7, the termination end section mounting member 15 is illustrated according to various aspects of the present invention. In the illustrative example, the optical fibers 12 of the fiber bundle are secured to the termination end holder 44. Moreover, suitable strain relief 46 is utilized to ensure a suitable connection between the optical fibers 12 and the corresponding second holder 44. For instance, the strain relief may be implemented using silicone. Moreover, the strain relief 46 can further be utilized to align the optical fibers 12 in the fiber bundle. In this regard, there may be some amount of reflection loss due to the air/silicone interface. In this exemplary configuration, the ferrule 42 may be approximately 50 mm long or longer.

Figure 8:
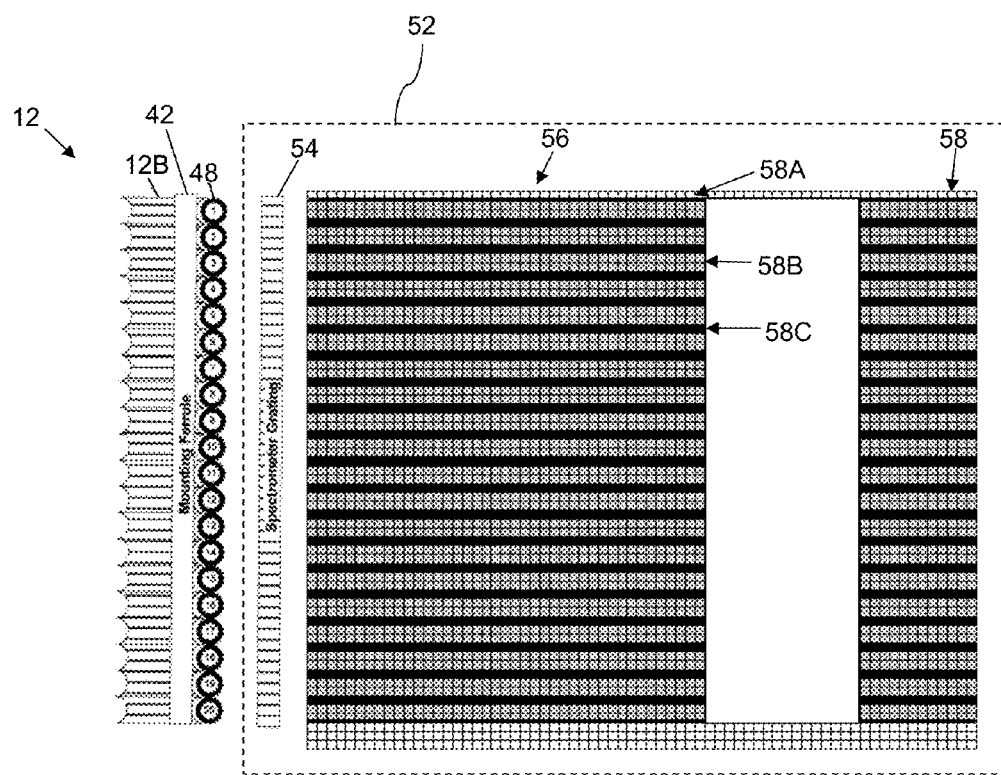
FIG. 8 is a schematic illustration of a configuration for the spatial mapping of light from a termination end of a fiber optic coupling assembly where optical fibers of a fiber bundle are arranged linearly with respect to an associated array detector, according to various aspects of the present invention.

Referring to FIG. 8, as noted in greater detail herein, the termination end portion 10B of the fiber optic coupling assembly 10 is suitable for coupling to an imaging spectrograph 52. As schematically illustrated, the terminal end 12B of each optical fiber 12 is secured to the termination end section mounting member and corresponding mounting ferrule 42 such that the relative position of the termination end 12B of each optical fiber 12 is fixed relative to each other. For instance, as schematically illustrated, the termination ends 12B of the optical fibers 12 form an optical fiber linear array, as shown by the vertical column of optical fibers 12, which are numbered 1 through 20 for purposes of illustration.

As further schematically illustrated, each optical fiber 12 is sheathed in a cladding layer 48, e.g., a coating that keeps light waves reflected inside a core of each associated optical fiber 12. As will be described in greater detail below, the cladding layer 48 may affect how tightly packed the termination ends 12B of the optical fibers 12 can be packed.

Light from the optical fibers 12 enters the spectrograph 52, is spectrally dispersed along a first dimension and spatially imaged along an orthogonal dimension. Keeping with the present example, the light is spatially imaged along the dimension of the optical fiber linear array, and is spectrally dispersed along a dimension that is orthogonal to the dimension of the optical fiber linear array.

For example, the spectrograph 52 may comprise a spectrometer grating 54 and an optical detector 56. Light from each optical fiber 12 is passed through the spectrometer grating 54, which disperses light onto the optical detector 56, e.g., a two dimensional charge coupled device (CCD). In an exemplary implementation, a relatively small distance, e.g., approximately 3 mm, can be present in front of the slit, which may limit the number of optical fibers that can be used in a particular application.

In the illustrative example, the spectrometer grating disperses light from the termination end of the optical fibers onto the optical detector such that the spatially separated light from each optical fiber is dispersed onto the optical detector along a dimension that is orthogonal to the dimension associated with the termination pattern.

For instance, as illustrated, the dispersed light from each optical fiber 12 is imaged onto a particular row or set of rows of the optical detector 56, depending on the height of the pixels of the optical detector 56 relative to the diameter of the optical fibers 12. In the exemplary implementation, lower-wavelength light is dispersed, for example, on the left side of an associated row of the grid schematically representing the optical detector 56, while the higher-wavelength light is dispersed, for example, on the right side of the associated row of the grid schematically representing the optical detector 56. The signal from each optical fiber 12 of the optical fiber bundle can therefore be recorded separately and related back to the spatial location of that fiber's input, e.g., the collection end 12A of each optical fiber 12.

As illustrated, the optical detector 56 comprises a plurality of pixels, denoted generally by the reference numeral 58, which are schematically represented by the cells of the illustrated grid. The pixels 58 include unused pixels 58A, which are schematically illustrated by white, unfilled cells. The pixels 58 also include utilized (also referred to herein as exposed) pixels 58B, which are illustrated in gray/crosshatch and define pixels that contain data from light that passes through the spectrometer grating 56 from an associated optical fiber 12. Although schematically represented with the same cross hatch for purposes of simplicity and clarity of discussion herein, in practice, each row will contain unique data associated with the light collected by its corresponding optical fiber.

The implementation of the termination end 12B of the fiber optic coupling assembly 10 as illustrated, uses optical fibers 12 with a core diameter twice as large as the pixel diameter of the pixels 58 of the optical detector 56 so that the signal from each optical fiber 12 is imaged on two detector rows, schematically illustrated by gray filled boxes.

The optical fiber cladding 48 limits how closely the optical fibers 12 can be packed next to one another and causes, in this example, a row of unused pixels between the data associated with adjacent optical fibers 12. Thus, where at least one optical fiber comprises a cladding layer, the cladding layer affects the packing of the termination end of the optical fibers to produce at least one pixel array of unused pixels between pixel arrays of utilized pixels of the optical detector, wherein each pixel array of utilized pixels records wavelength resolved light from an associated optical fiber. These rows of unused pixels are the cladding pixels 58C, which are shaded black in FIG. 8.

As a few illustrative examples, when a multi-mode optical fiber 12 is utilized, it may be desirable to use at least two rows of pixels 58 of the optical detector 56 per optical fiber 12. Alternatively, it may be satisfactory to use one row of pixels 58 of the optical detector 56 per optical fiber 12, e.g., where the optical fiber 12 comprises a single mode fiber. Other configurations may alternatively be utilized.

Figure 9:
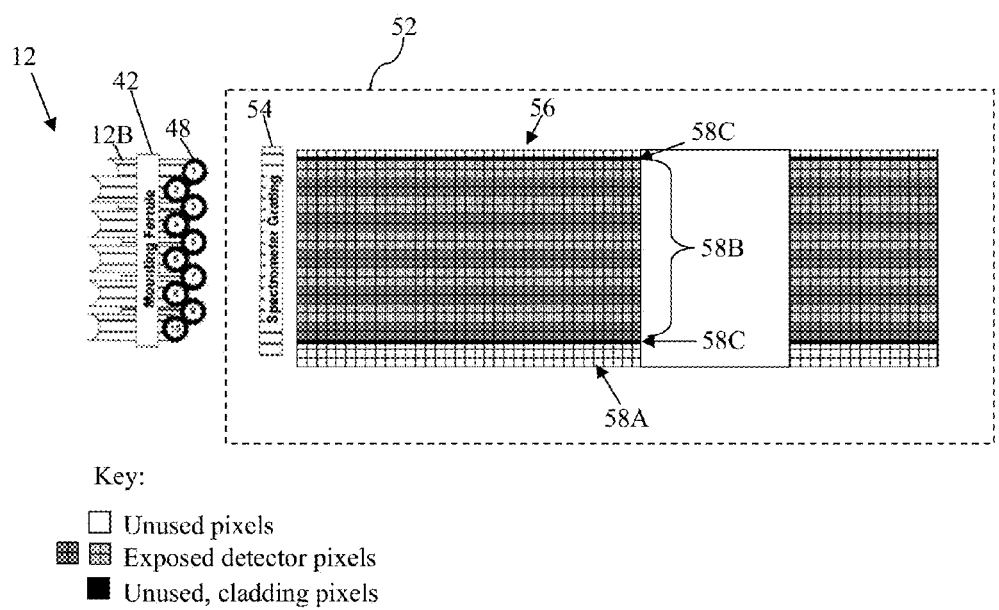
FIG. 9 is a schematic illustration of a configuration for the spatial mapping of light from a termination end of a fiber optic coupling assembly where optical fibers of a fiber bundle are arranged in a zigzag formation with respect to an associated array detector, according to further aspects of the present invention.

Referring to FIG. 9, a second exemplary implementation is illustrated. Herein, each optical fiber comprises a cladding layer. However, the termination pattern of the optical fibers forms a pattern arranged such that the cladding layer of each of the optical fibers does not interfere with exposing adjacent pixel arrays of utilized pixels on the optical detector by adjacent optical fibers, where each pixel array of utilized pixels records wavelength resolved light from an associated optical fiber.

For instance, as illustrated, the termination pattern stacks the termination end 12B of at least a portion of the optical fibers 12 in a zigzag arrangement. This zigzag stacking of at least a portion of the optical fiber termination ends allows more optical fibers 12 to be imaged on the same size detector array 56 relative to a fiber optic linear array (as described in reference to FIG. 8), and thus avoids or otherwise reduces unused pixel rows due to cladding and other layers on the optical fibers 12. As such, the number of optical fibers 12, and therefore the number of spatial locations imaged, can be maximized for a given optical detector 56. In this regard, the number of rows in the detector array set the limit to the number of available simultaneous measurements, and correspondingly, the number of optical fibers utilized without requiring a multiplexer, switch or other complicated circuitry.

According to various aspects of the present invention, any optical spectroscopic imaging implementation may utilize the fiber optic coupling assembly 10, according to various aspects of the present invention. For example, imaging spectroscopy is in use in agrifoods, pharmaceutical, and medical applications as well as quality assurance and non-destructive evaluation of manufactured goods.

Figure 10:
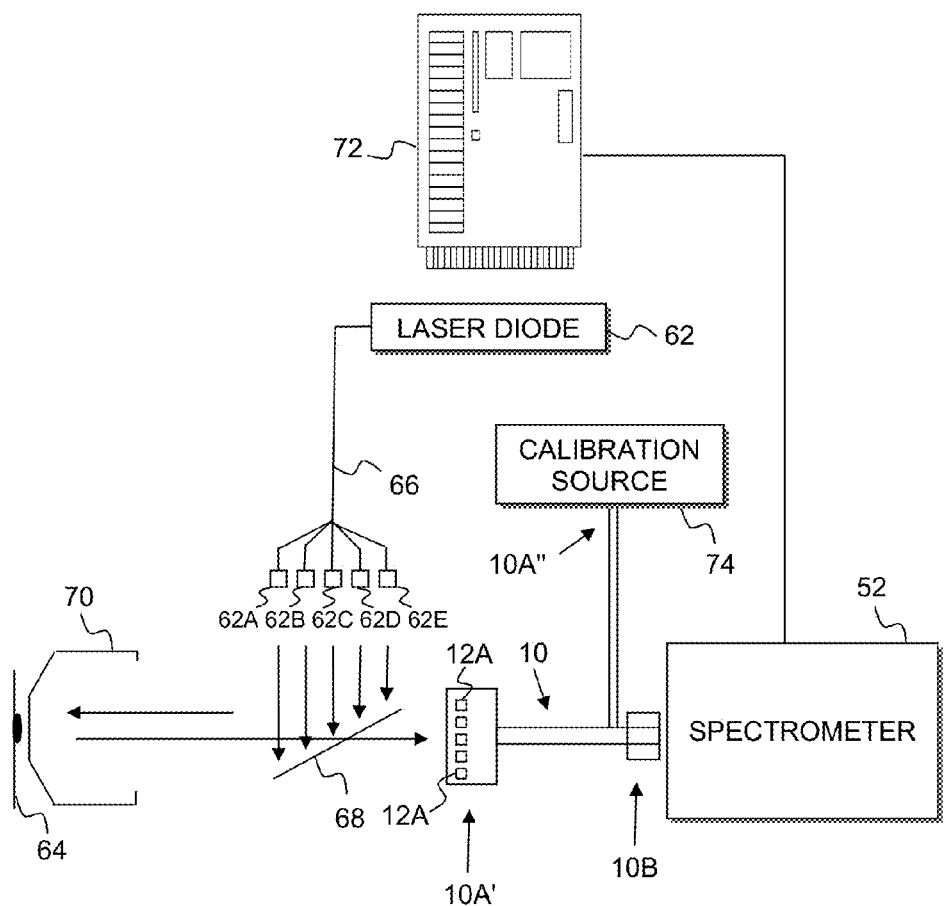
FIG. 10 is a schematic illustration of a Raman interrogation system that utilizes a fiber optic coupling assembly, according to various aspects of the present invention.

Referring to FIG. 10, an exemplary spectrographic data collection system 60 is illustrated. The spectrographic data collection system 60 may comprise, for example, a Raman system. In general, the spectrographic data collection system 60 comprises light collection optics, a spectrograph and a fiber optic coupling assembly, e.g., which is described more fully herein.

Light collection optics collect light from a sample area. For example, as illustrated, an excitation source 62, e.g., a laser source, directs one or more beams of light towards a sample area 64 having a sample located there on. In the exemplary illustration, light from the excitation source 62 is coupled along the optical fiber system 66 to an optical device 68, which directs the light to the sample area 64 through an objective 70. Light from the sample area 64 is returned back through the objective 70, through collection optics, which includes one or more optical devices, e.g., optical device 68. In this regard, conventional optical devices such as filters, beam splitters, lenses, mirrors etc., may be necessary to direct light from the objective to the fiber optic coupling assembly 10.

In a manner analogous to that already described herein, the fiber optic coupling assembly comprises a plurality of optical fibers, each optical fiber having a collection end and a termination end. A primary collection mounting member holds the collection end of at least a portion of the plurality of optical fibers in a collection pattern such that the collection end of each optical fiber has a known spatially resolved position relative to the collection end of at least one other optical fiber held by the primary collection mounting member. Moreover, the collection ends of at least two optical fibers held by the primary collection mounting member are spaced from each other sufficiently to collect light from distinct spatial regions of the sample area in cooperation with the light collecting optics. At least one micro lens is secured to the mounting member so as to couple light to a corresponding collection end of an associated optical fiber. Correspondingly, a termination mounting member holds the termination end of the plurality of optical fibers in a termination pattern arranged to interface to an input of the spectrograph. Light received at the input of the spectrograph 52 is coupled to a detector of the spectrograph 52 as described more fully herein, e.g., with reference to FIGS. 8 and 9.

The fiber optic coupling assembly 10 efficiently couples spatially resolved light received from the light collection optics to the spectrograph 52, as described more fully herein. For example, in an illustrative implementation, light that enters the spectrograph 52 from the optical fibers maintains spatial separation along the termination pattern of the optical fibers held by the termination mounting member and light is spectrally dispersed onto the optical detector so as to record spatially separated, wavelength resolved light. Moreover, as illustrated, the output of the spectrograph 52 is coupled to a processor 72. As such, systems and methods can be implemented for simultaneously and separately recording signal spectra collected from a sample area such that each separately recorded signal spectrum can be related back to its corresponding spectral location.

With continued reference to FIG. 10, optical fibers 12 in the collection end 12A are positioned to correspond with a position of an associated excitation beam from the laser 62. Each laser output 62A, 62B, 62C, 62D, 62E of the laser 62 produces a separate beam of light which is directed through the objective 70, toward a different, discrete interrogation region of the sample area 64. Thus, spatially separated laser outputs are utilized to interrogate multiple, distinct target areas of a sample region simultaneously. For instance, multiple targets or locations of interest within a sample area may be simultaneously interrogated. Because the collection end of each optical fiber has a known spatially resolved position and because each optical fiber couples its collected light to a known row or rows on the detector, the system preserves the spatial separation of the data of each targeted location within the sample area and is thus able to simultaneously record spatially separated, wavelength resolved light.

Light from the sample area 64 is coupled to corresponding collection ends 12A of the fiber bundle. In this regard, corresponding optical fibers 12 collect the light from the various different, discrete interrogation regions for simultaneous data collection. In illustrative example, there are five laser outputs 62 and five associated collection ends 12A, but other numbers of laser outputs 62 and collection ends 12A are possible.

According to further aspects of the present invention, in certain implementations, the termination end 10B of the fiber optic coupling assembly 10 is coupled to one or more collecting ends of the fiber optic coupling assembly 10. For instance, as illustrated, a first collection end 10A' comprises a primary collection mounting member that holds the collection end of at least a portion of the plurality of optical fibers 12 of the fiber bundle. The first collection end 10A' is utilized to collect light from the sample area. Moreover, a second collection end 10A" comprises a secondary mounting member that holds the collection end of at least a portion of the remainder of the plurality of optical fibers not held by the primary collection mounting member. As illustrated, the secondary collection end 10" is utilized to collect light from a different light source, e.g., light from a calibration source 74.

In an illustrative example, the calibration source is operative to emit a calibration light that is coupled to the collection end of at least one optical fiber held by the secondary collection mounting member to provide a signal to calibrate the optical detector. For instance, the system provides a calibration input that allows the system to adjust the performance of the optical detector 26 to reduce or prevent the deterioration of detector performance, e.g., because of sensitivity drifts due to time, temperature, latent defects, etc. As illustrated, a neon lamp capable of outputting a precise wavelength of light is utilized as a calibration source. The output of the neon lamp is coupled to one of the collecting ends of the fiber optic coupling assembly 10 to provide a precise wavelength to calibrate the optical detector 56. As such, during calibration operations, the system can calibrate the CCD, e.g., determine each wavelength for each CCD column. Accordingly, as illustrated, an optical fiber 12 for collecting calibration radiation is provided in the same termination end mounting member 15 as the optical fibers 12 for collecting the signal radiation.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The description of the present invention has been presented for purposes of illustration and description, but is not intended to be exhaustive or limited to the invention in the form disclosed. Many modifications and variations will be apparent to those of ordinary skill in the art without departing from the scope and spirit of the invention.

Having thus described the invention of the present application in detail and by reference to embodiments thereof, it will be apparent that modifications and variations are possible without departing from the scope of the invention defined in the appended claims.

What is claimed is:

1. A fiber optic coupling assembly comprising:
   a plurality of optical fibers, each optical fiber having a collection end and a termination end;
   a primary collection mounting member that holds the collection end of a first portion of the plurality of optical fibers in a collection pattern such that:
      the collection end of each optical fiber is spaced apart from adjacently held optical fibers; and
      the collection end of each optical fiber has a known spatially resolved position relative to the collection end of at least one other optical fiber held by the primary collection mounting member;
   at least one micro lens secured to the mounting member so as to couple light to a corresponding collection end of an associated optical fiber;
   a secondary collection mounting member remotely positionable from the primary collection mounting member, wherein the secondary collection mounting member holds the collection end of a second portion of the plurality of optical fibers such that at least one of the plurality of optical fibers is not held by the primary collection mounting member; and
   a termination mounting member that holds the termination end of the plurality of optical fibers in a termination pattern arranged to interface to an input of an associated detection system.

2. The fiber optic coupling assembly according to claim 1, wherein:
   the collection pattern is defined as a substantially linear array; and
   the primary collection mounting member holds the collection end of each optical fiber at a known pitch from the collection end of adjacent optical fibers.

3. The fiber optic coupling assembly according to claim 1, wherein the at least one micro lens comprises a micro lens array secured to the primary collection mounting member such that a micro lens aligns in register with a corresponding collection end of an associated optical fiber.

4. The fiber optic coupling assembly according to claim 3, wherein:
   the primary collection mounting member comprises a two part housing having a first facet for securing the micro lens array and a plurality of spaced channels, each channel for receiving a corresponding optical fiber, which is secured between the two housing parts such that a gap exists between the collection end of each optical fiber and its corresponding micro lens.

5. The fiber optic coupling assembly according to claim 1, wherein the collection end of at least two optical fibers held by the primary collection mounting member are spaced from each other by an amount sufficient to collect light from independent regions of a sample area when the first portion of the plurality of optical fibers is coupled to associated light collection optics.

6. A spectrographic data collection system comprising:
   light collection optics that collect light from a sample area;
   a spectrograph having an input and an optical detector;
   a fiber optic coupling assembly that couples light from the light collection optics to the spectrograph, the fiber optic coupling assembly having:
      a plurality of optical fibers, each optical fiber having a collection end and a termination end;
      a primary collection mounting member that holds the collection end of a first portion of the plurality of optical fibers in a collection pattern such that:
         the collection end of each optical fiber has a known spatially resolved position relative to the collection end of at least one other optical fiber held by the primary collection mounting member; and
         the collection ends of at least two optical fibers held by the primary collection mounting member are spaced from each other sufficiently to collect light from distinct spatial regions of the sample area in cooperation with the light collecting optics;
      at least one micro lens secured to the mounting member so as to couple light to a corresponding collection end of an associated optical fiber;
      a secondary collection mounting member remotely positionable from the primary collection mounting member, wherein the secondary collection mounting member holds the collection end of a second portion of the plurality of optical fibers such that at least one of the plurality of optical fibers is not held by the primary collection mounting member; and a termination mounting member that holds the termination end of the plurality of optical fibers in a termination pattern arranged to interface to the input of the spectrograph;

wherein:
light that enters the spectrograph from the optical fibers maintains spatial separation along the termination pattern of the optical fibers held by the termination mounting member and light is spectrally dispersed onto the optical detector so as to record spatially separated, wavelength resolved light.

7. The optical system according to claim 6, wherein the spectrograph comprises:
a spectrometer grating that disperses light from the termination end of the optical fibers onto the optical detector such that the spatially separated light from each optical fiber is dispersed onto the optical detector along a dimension that is orthogonal to the dimension associated with the termination pattern.

8. A spectrographic data collection system comprising:
light collection optics that collect light from a sample area;
a spectrograph having an input and an optical detector;
a fiber optic coupling assembly that couples light from the light collection optics to the spectrograph, the fiber optic coupling assembly having:
a plurality of optical fibers, each optical fiber having a collection end and a termination end;
a primary collection mounting member that holds the collection end of a first portion of the plurality of optical fibers in a collection pattern such that:
the collection end of each optical fiber has a known spatially resolved position relative to the collection end of at least one other optical fiber held by the primary collection mounting member; and
the collection ends of at least two optical fibers held by the primary collection mounting member are spaced from each other sufficiently to collect light from distinct spatial regions of the sample area in cooperation with the light collecting optics;
at least one micro lens secured to the mounting member so as to couple light to a corresponding collection end of an associated optical fiber; and
a termination mounting member that holds the termination end of the plurality of optical fibers in a termination pattern arranged to interface to the input of the spectrograph;

wherein:
light that enters the spectrograph from the optical fibers maintains spatial separation along the termination pattern of the optical fibers held by the termination mounting member and light is spectrally dispersed onto the optical detector so as to record spatially separated, wavelength resolved light; and
at least one optical fiber comprises a cladding layer, the cladding layer affecting the packing of the termination end of the optical fibers to produce at least one pixel array of unused pixels between pixel arrays of utilized pixels of the optical detector, wherein each pixel array of utilized pixels records wavelength resolved light from an associated optical fiber.

9. A spectrographic data collection system comprising:
light collection optics that collect light from a sample area;
a spectrograph having an input and an optical detector;
a fiber optic coupling assembly that couples light from the light collection optics to the spectrograph, the fiber optic coupling assembly having:

a plurality of optical fibers, each optical fiber having a collection end and a termination end;
a primary collection mounting member that holds the collection end of a first portion of the plurality of optical fibers in a collection pattern such that:
the collection end of each optical fiber has a known spatially resolved position relative to the collection end of at least one other optical fiber held by the primary collection mounting member; and
the collection ends of at least two optical fibers held by the primary collection mounting member are spaced from each other sufficiently to collect light from distinct spatial regions of the sample area in cooperation with the light collecting optics;
at least one micro lens secured to the mounting member so as to couple light to a corresponding collection end of an associated optical fiber; and
a termination mounting member that holds the termination end of the plurality of optical fibers in a termination pattern arranged to interface to the input of the spectrograph;

wherein:
light that enters the spectrograph from the optical fibers maintains spatial separation along the termination pattern of the optical fibers held by the termination mounting member and light is spectrally dispersed onto the optical detector so as to record spatially separated, wavelength resolved light; and
each optical fiber comprises a cladding layer, and the termination pattern of the optical fibers forms a pattern arranged such that the cladding layer of each of the optical fibers does not interfere with exposing adjacent pixel arrays of utilized pixels on the optical detector by adjacent optical fibers, where each pixel array of utilized pixels records wavelength resolved light from an associated optical fiber.

10. The optical system according to claim 9, wherein at least a portion of the termination pattern forms a zigzag pattern.

11. The optical system according to claim 6, wherein at least one optical fiber exposes at least two rows of pixels of the optical detector.

12. The optical system according to claim 6, wherein at least a portion of the collection pattern is defined as a substantially linear array; and
the primary collection mounting member holds the collection end of each optical fiber at a known pitch from the collection end of adjacent optical fibers.

13. The optical system according to claim 6, wherein:
the at least one micro lens comprises a micro lens array secured to the primary collection mounting member such that a micro lens aligns in register with a corresponding collection end of an associated optical fiber; and
the primary collection mounting member comprises a two part housing having a first facet for securing the micro lens array and a plurality of spaced channels, each channel for receiving a corresponding optical fiber, such that each optical fiber is secured within its corresponding channel and between the two housing parts.

14. The optical system according to claim 13, wherein:
each optical fiber held by the primary collection mounting member includes at least a portion of its length within the primary collection mounting member that is stripped of its cladding layer; and the optical fibers held by the primary collection mounting member are configured such that a gap exists between the collection end of each optical fiber and its corresponding micro lens.

15. The optical system according to claim 6, wherein the termination mounting member comprises a two part housing that is fitted inside a ferrule.

16. The optical system of claim 6, further comprising a calibration source operative to emit a calibration light that is coupled to the collection end of at least one optical fiber held by the secondary collection mounting member to provide a signal to calibrate the optical detector.

17. The optical system of claim 6, wherein:
the light collection optics further comprise a first numerical aperture and the spectrograph further comprises a second numerical aperture; and
the fiber optic coupling assembly translates light between the first numerical aperture and the second numerical aperture.

18. A method of optically coupling light in a system comprising:
utilizing light collection optics that collect light from a sample area;
utilizing a spectrograph having an input and an optical detector;
arranging a fiber optic coupling assembly to couple light from the light collection optics to the spectrograph, the fiber optic coupling assembly having:
a plurality of optical fibers, each optical fiber having a collection end and a termination end;
a primary collection mounting member that holds the collection end of a first portion of the plurality of optical fibers in a collection pattern such that:
the collection end of each optical fiber has a known spatially resolved position relative to the collection end of at least one other optical fiber held by the primary collection mounting member; and
the collection ends of at least two optical fibers held by the primary collection mounting member are spaced from each other sufficiently to collect light from distinct spatial regions of the sample area in cooperation with the light collecting optics;
a secondary collection mounting member remotely positionable from the primary collection mounting member, wherein the secondary collection mounting member holds the collection end of a second portion of the plurality of optical fibers such that at least one of the plurality of optical fibers is not held by the primary collection mounting member;
a termination mounting member that holds the termination end of the plurality of optical fibers in a termination pattern arranged to interface to the input of the spectrograph; and
aligning a plurality of micro lenses secured to the mounting member such that a micro lens aligns in register with a corresponding collection end of an associated optical fiber;
wherein:
light that enters the spectrograph from the optical fibers maintains spatial separation along the termination pattern of the optical fibers held by the termination mounting member and light is spectrally dispersed along an orthogonal dimension onto the optical detector so as to record spatially separated, wavelength resolved light.

* * * * *